(No Model.) 6 Sheets—Sheet 1.
A. W. CASH.
PIPE THREADING AND CUTTING OFF MACHINE.
No. 434,424. Patented Aug. 19, 1890.
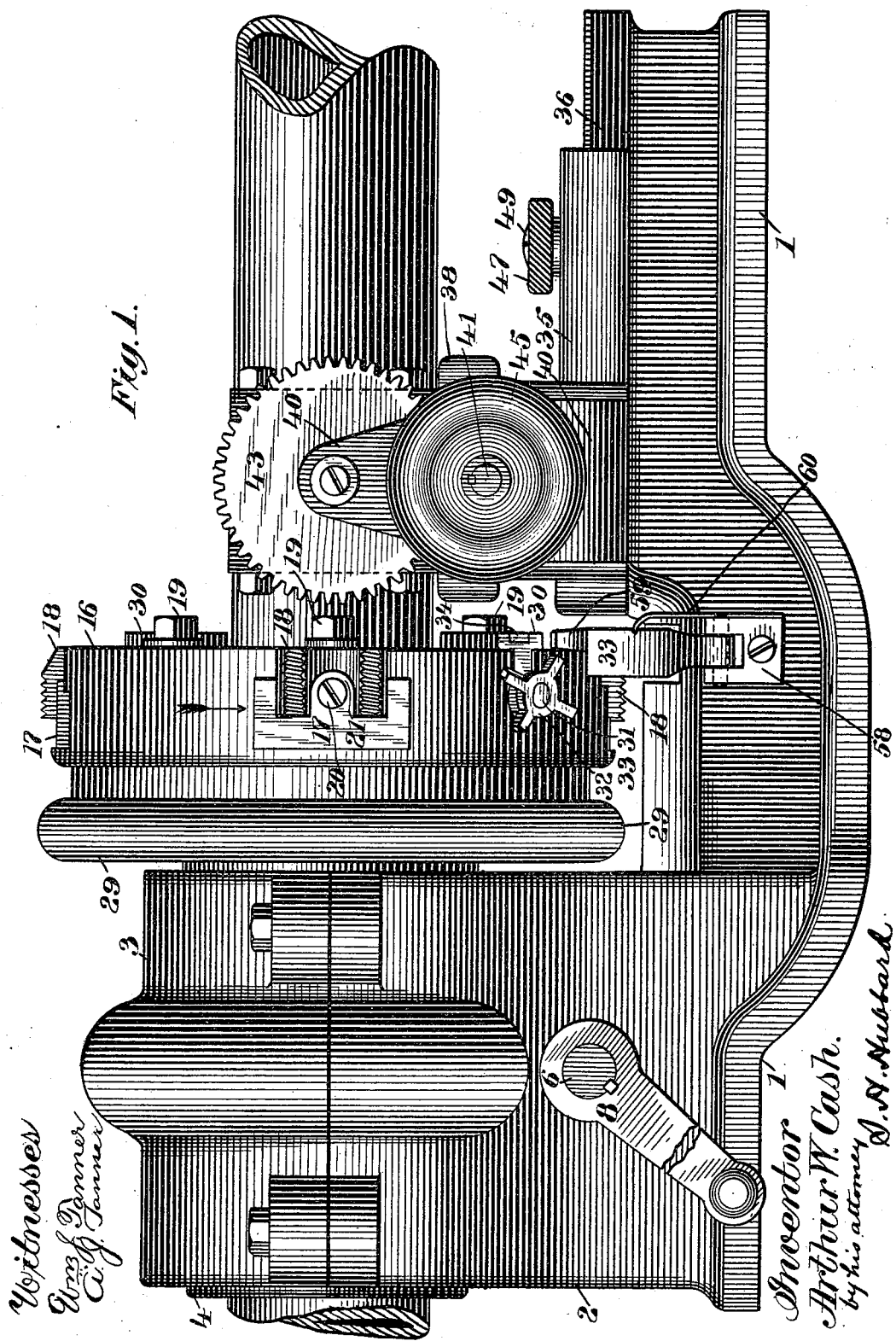

(No Model.) 6 Sheets—Sheet 2.
A. W. CASH.
PIPE THREADING AND CUTTING OFF MACHINE.
No. 434,424. Patented Aug. 19, 1890.
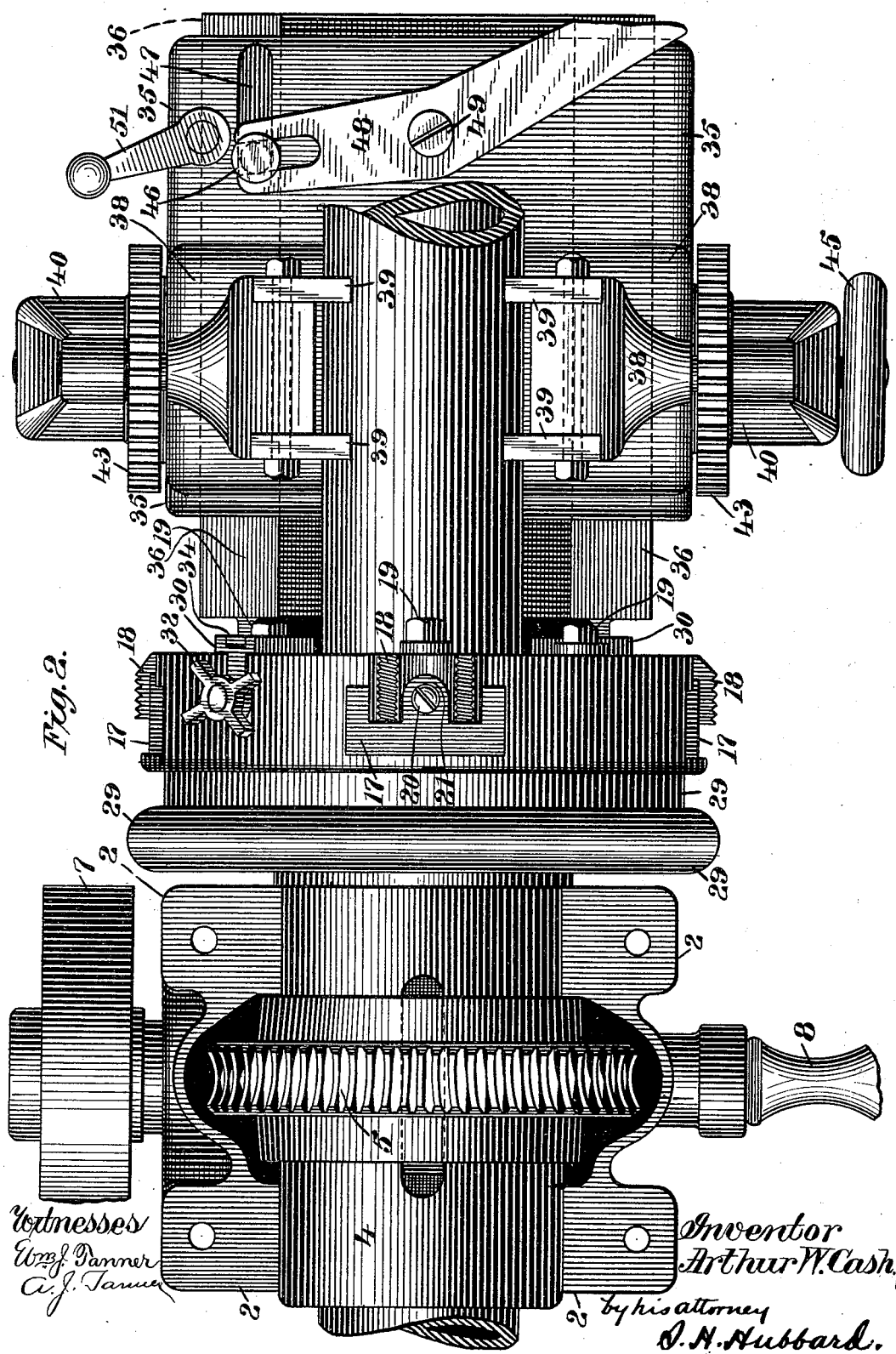

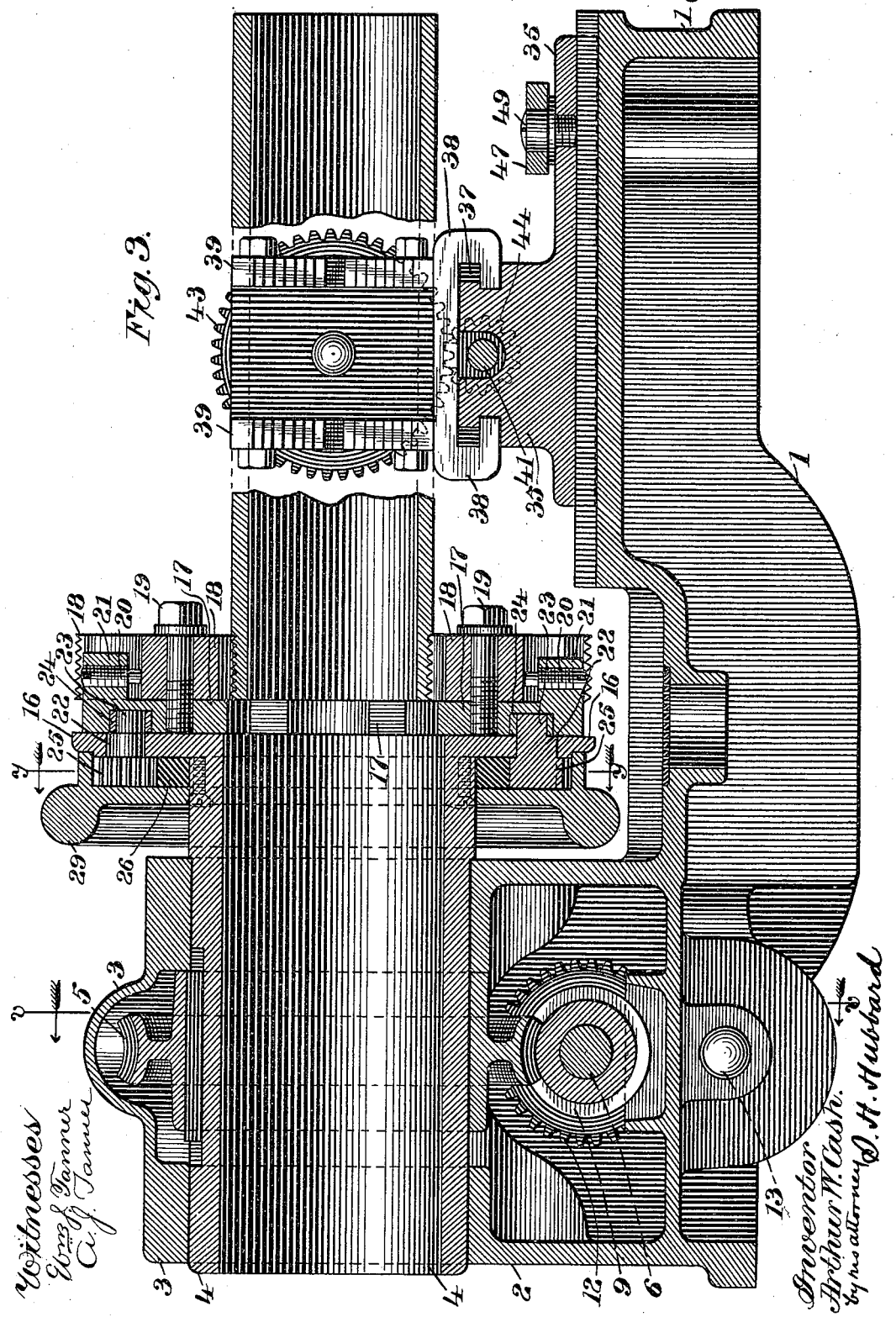

(No Model.) 6 Sheets—Sheet 4.
A. W. CASH.
PIPE THREADING AND CUTTING OFF MACHINE.
No. 434,424. Patented Aug. 19, 1890.
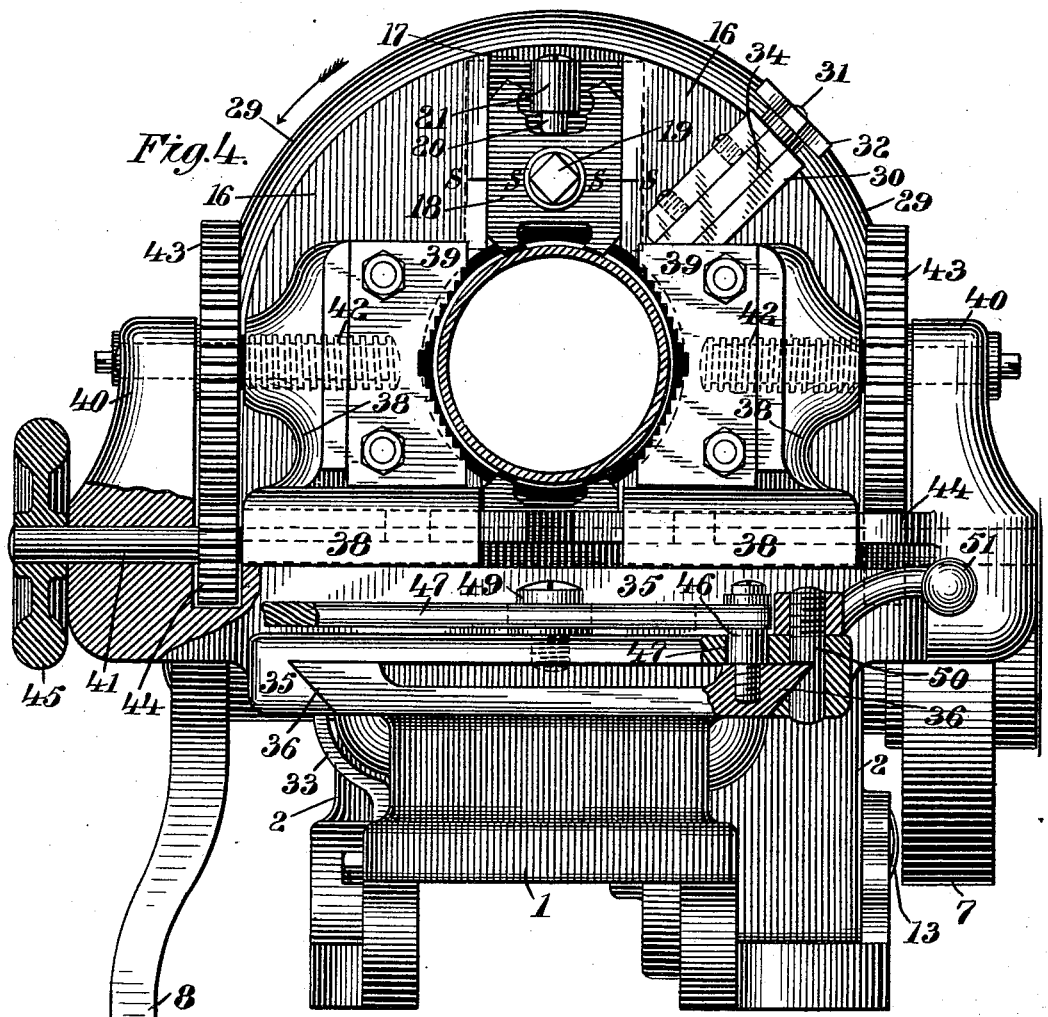

(No Model.) 6 Sheets—Sheet 5.
A. W. CASH.
PIPE THREADING AND CUTTING OFF MACHINE.
No. 434,424. Patented Aug. 19, 1890.
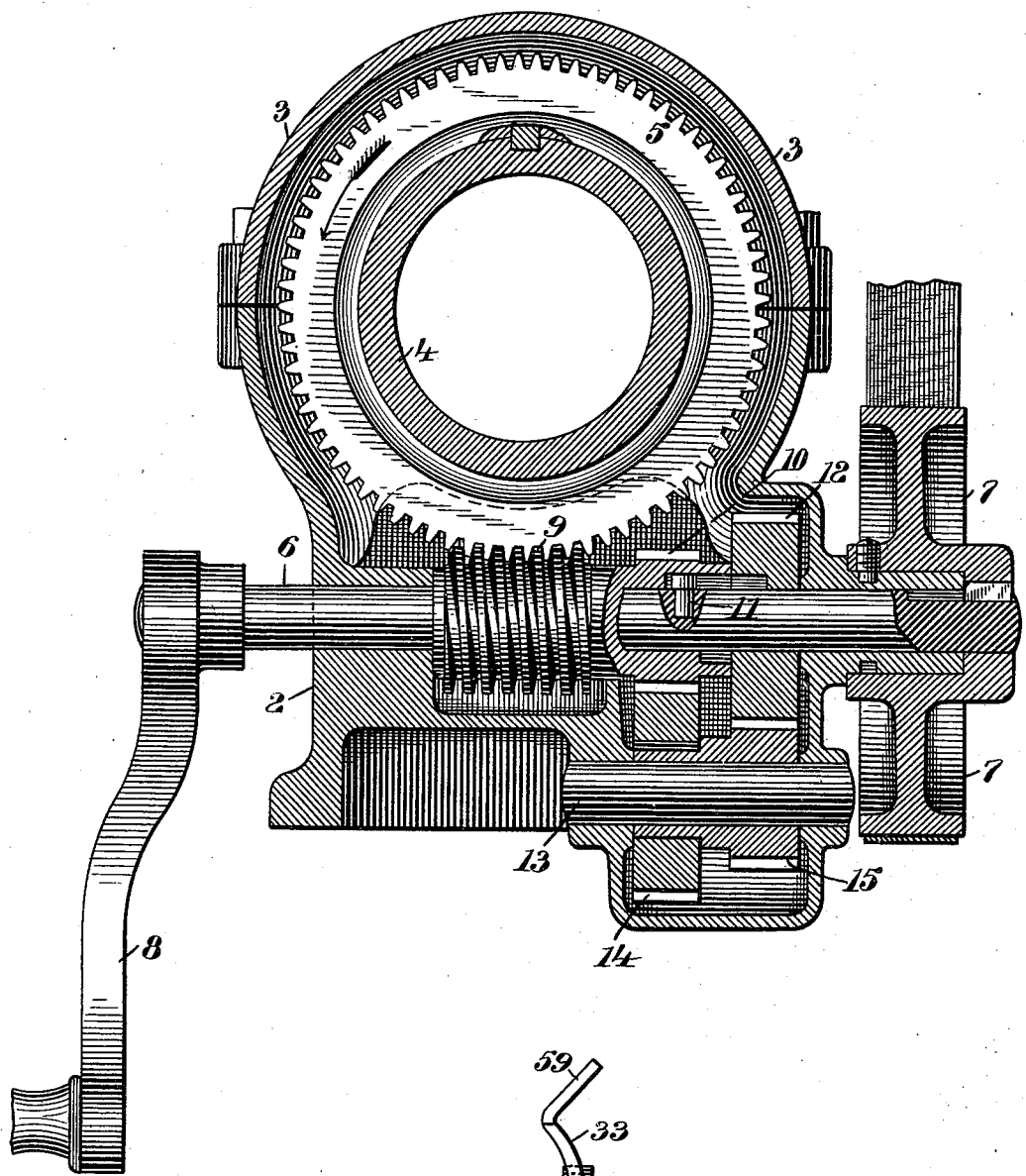

(No Model.) 6 Sheets—Sheet 6.
A. W. CASH.
PIPE THREADING AND CUTTING OFF MACHINE.
No. 434,424. Patented Aug. 19, 1890.
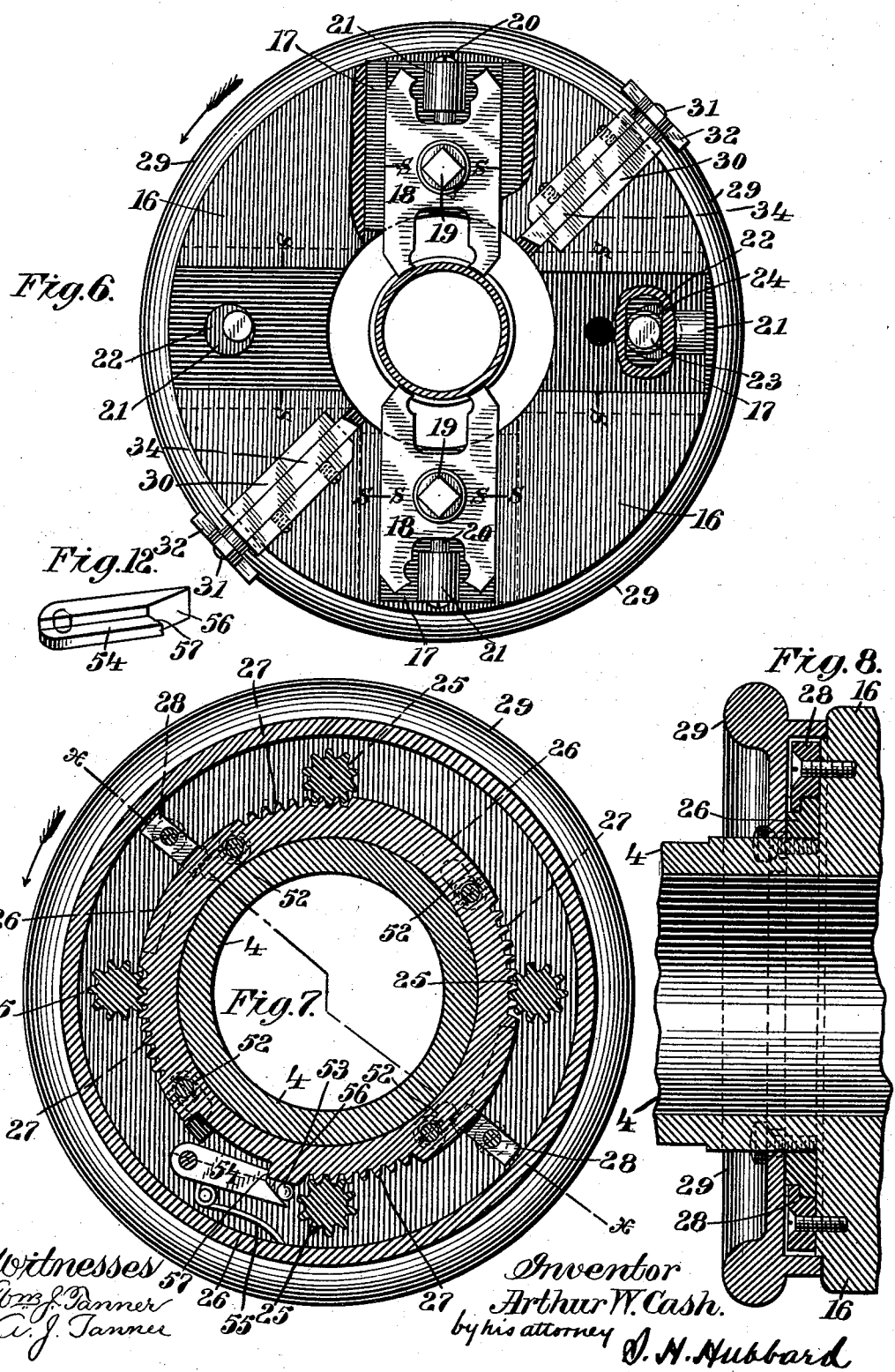

UNITED STATES PATENT OFFICE.

ARTHUR W. CASH, OF BRIDGEPORT, CONNECTICUT, ASSIGNOR TO THE ARMSTRONG MANUFACTURING COMPANY, OF SAME PLACE.

PIPE THREADING AND CUTTING-OFF MACHINE.

SPECIFICATION forming part of Letters Patent No. 434,424, dated August 19, 1890.

Application filed April 28, 1890. Serial No. 349,830. (No model.)

*To all whom it may concern:*

Be it known that I, ARTHUR W. CASH, a citizen of the United States, residing at Bridgeport, in the county of Fairfield and State of Connecticut, have invented certain new and useful Improvements in Pipe Threading and Cutting-Off Machines; and I do hereby declare the following to be a full, clear, and exact description of the invention, such as will enable others skilled in the art to which it appertains to make and use the same.

My invention relates to certain new and useful improvements in machines for threading and cutting off pipe, shafting, and the like, and has for its objects, first, to provide a machine which shall be simple and durable in its parts and which may be operated either by hand or by power; second, to provide in the same machine, so as to be readily interchangeable, both an efficient threading mechanism and competent cutting-off tools; third, to arrange for the ready change of the machine for operation upon different sizes of work; fourth, to provide means for readily varying the speed at which the threading or cutting-off tools are caused to operate; fifth, to arrange for the ample lubrication of all the parts and at the same time exclude from the operating mechanism dirt and cuttings from the work; and, seventh, to provide, in combination with the cutting devices, a suitable vise for holding and presenting the work to the cutting mechanism, said vise being novel in construction and so arranged that the power is applied directly behind the center of the vise-jaws; and with these ends in view my invention consists in the construction and combination of elements, as hereinafter fully described, and particularly as recited in the claims hereunto annexed.

In order that those skilled in the art to which my invention appertains may fully understand its construction and operation, I will describe the same in detail, reference being had to the accompanying drawings, which form a part of this specification, and in which—

Figure 1 is a side elevation of my machine, the legs being omitted; Fig. 2, a plan view; Fig. 3, a central vertical longitudinal section through the machine; Fig. 4, an end elevation looking from the right of Fig. 1; Fig. 5, a transverse vertical section at the line $v\ v$ of Fig. 3, looking in the direction of the arrow; Fig. 6, a detail front elevation of the die-carrying head, the same having two of its dies arranged for threading small work. At the right the die-block or carriage is partially broken away. At the left it is removed entirely. Fig. 7 is a vertical transverse section at line $y\ y$ of Fig. 3, looking in the direction of the arrow; Fig. 8, a detail vertical section at line $x\ x$ of Fig. 7; Fig. 9, a detail section through one side of the head, the cutting-off tool being shown in elevation; Fig. 10, a transverse section at line $z\ z$ of Fig. 9; Fig. 11, a detail showing the construction of the trip whereby the inward feeding of the cutting-off tool is accomplished; and Fig. 12 a detail perspective of the locking-pawl whereby the threading-dies are secured in their cutting position.

In Figs. 1, 2, and 3 the machine is shown arranged to operate as a cutter; in the other figures as a threader.

Like numerals denote the same parts in all the figures of the drawings.

The operative parts of the machine, both for holding and cutting, are mounted upon a bed or base 1, which is preferably provided with suitable legs, (not shown), but which in small machines may be arranged for support upon a bench or table. At the rear of this base is a hollow upward projection 2, (shown in longitudinal and transverse section at Figs. 3 and 5,) said projection being adapted to contain certain of the working parts and being preferably closed at its bottom for a purpose hereinafter referred to. A cap or cover 3 is secured upon the top of the projection just described, and in the faces of the two parts are formed two journal-bearings, in which a hollow shaft 4 is mounted and adapted to revolve. Between the two bearings just referred to and keyed or otherwise rigidly secured on the hollow shaft is a worm-gear 5, for the accommodation of which the cover and sides of the projection 2 are conformed, as is clearly seen at Figs. 1 and 3. Passing through the base just below the periphery of the gear 5, and supported in suitable bearings formed in said base, is a primary shaft 6, having upon one end a pulley 7 and at the other a crank 8, by either of which power may be applied to it.

9 is a worm, having integral therewith or rigidly secured thereto a gear 10. The shaft 6 passes axially through this gear and worm and is provided with a stud 11, which, when in the position shown at Fig. 5, rests in a recess in the end of the gear 10, and so locks the shaft and worm and gear together, but which by lengthwise movement of the shaft in its bearings may be caused to engage a similar recess in a gear 12, which is journaled on the shaft contiguous to but independent of the gear 10. Upon a shaft 13, preferably located immediately beneath the primary shaft, are two gears 14 15, identical in size with the gears 10 12 and meshing therewith, but of course reversed in position relative thereto, as seen at Fig. 5. These two gears 14 15 are either formed integral or are secured together, as by a key. The parts just specified constitute a change-speed gearing whereby either of two speeds may be imparted to the hollow shaft through the worm meshing with the worm-gear. When the stud 11 is in engagement with gear 10, said gear and shaft are locked together, and said gear and the worm will make one revolution to each turn of the shaft. The gear 10 at this time, through gears 14 15, causes the gear 12 to revolve idly upon the primary shaft as an axis. When the shaft has been moved longitudinally in its bearings, so that the stud engages the gear 12 and locks it fast to the shaft, the power is transmitted to the worm through the gears 12, 15, 14, and 10, and consequently said worm acquires a movement about the shaft as an axis differentially speeded from said shaft.

Upon the forward end of the hollow shaft is a circular head 16, in which the dies and the cutting-off tools are mounted. Said head has ways cut therein and extending radially from its central opening to its periphery, as is seen at Fig. 6. These ways are shaped as appears from the end view of the die-block 17 in Fig. 2, there being, as will be readily understood, a number of these die-blocks, preferably four, although a less or a greater number would answer the purpose. Upon each of these die-blocks is secured a threading-die 18, preferably of the ordinary H shape, so as to be reversible for the employment of either of its cutting-faces. A screw 19, tapped into the die-block, secures the die thereon, and a set-screw 20, passed through a lug 21 on the block and adapted to engage the die, operates to bind said die as against any movement about its central screw. The face of the head (see Fig. 6) preferably bears gage-marks lettered S, by which the standard-marks upon the dies may be set.

Behind each of the die-blocks (see Figs. 3 and 6) is a short shaft 22, journaled in the head. Upon its forward end each shaft has an eccentric wrist 23, which projects into a transverse slot in the die-block. A sleeve 24 is interposed between the wrist and the walls of the slot for the purpose of diminishing friction. Upon its inner end each of these short shafts carries a small gear 25, axially arranged thereon.

26 is a ring, rectangular in cross-section, as seen at Figs. 3 and 8, and of such size as to fit snugly around the hollow shaft just behind the head. In its periphery this ring has four short toothed sections, each being shown as about one-eighth of its circumference. These toothed sections mesh with the gears, and are so adapted thereunto as to be capable of imparting to them and to their short shafts a little more than a full one-half rotation in their bearings in the head; but the precise extent of movement is immaterial.

For the purpose of holding the ring against the rear face of the head, but at the same time permitting to said ring a limited movement about the shaft as an axis, the edge of said ring is cut away at two or more places, (see particularly Figs. 7 and 8,) and shouldered blocks 28 are secured to the head, with their shoulders overlapping the cut-away portions of the ring.

Immediately at the rear of the ring and closely adapted to the hollow shaft is a hand-wheel 29. By means of slots and screws 52 (see Fig. 7) said ring and hand-wheel are secured together, so that said wheel may move independently of the ring for the length of the slot, and will then carry the ring with it about the hollow shaft. The hand-wheel is provided with a pin 53, which projects inward to within a short distance of the face of the head, passing close to the periphery of the ring. This pin is adapted to operate a pawl 54, which is pivoted against the head, and is impelled inwardly by a spring 55. Said pawl is shown as inverted in the detail perspective, Fig. 12. It has the inclined face 56 and the shoulder, which latter is adapted to engage a shoulder on the ring, and thereby lock the latter as against movement until the shouldered pawl is withdrawn. The pawl is cut away at the side toward the pin, so that the latter, while competent to engage the inclined surface thereof, and thereby withdraw it against the force of its spring, will thereafter pass freely over the flange formed by cutting away said pawl, as seen at Fig. 12, and so hold it out of engagement. As will be readily understood, the first movement of the hand-wheel does not move the ring until the limit prescribed by the screw and slot connection is reached and the locking-pawl disengaged, after which the ring moves with the hand-wheel. Upon the return movement of the wheel, when the pin passes out of engagement with the pawl, the spring throws the latter back into engagement with the ring. The purpose of this hand-wheel and ring and the gears and eccentrically-placed wrists is to impart radial movement to the die-blocks and dies in the head, so as either to project the dies inward into proper position to engage and operate upon the end of a pipe or bar, (see Figs. 3, 4, and 6,) or to project said dies outward, leaving the center of the hollow shaft clear for the insertion and adjustment of new work. This radial movement of the dies is accomplished by turning the hand-wheel which carries the ring, and by engaging the gears causes the eccentric wrists to operate the die-blocks inward or outward in their ways in the head, as the case may be, as will be readily understood by reference to Figs. 3 and 6. The axial movement of the cranked wrists is preferably a full one-half revolution, so that, if required, the dies may be locked in their inward position by the cranked wrist standing on a dead-center, whereby said dies cannot be displaced, except by power applied to them through the hand-wheel. I prefer, however, to employ the locking-pawl heretofore described; but the locking by the cranks is adjunctory thereto and might serve in case of breakage of the pawl, and in that case the movement of the cranks may be less than one-half.

The cutting-off mechanism of my machine consists of a pair of small T-shaped carriages 30, arranged in the head opposite each other and between the die-blocks. Feeding-screws 31 pass through the lower portions of the carriages and are shouldered in the head, so as to feed the carriages inward or outward, as required. At the outer end of each screw is a four-armed feeding-wheel 32, whose arms project into the field of a movable trip 33 when the latter is in the position shown at Fig. 1. Each of the carriages is provided with an adjustable tool 34 and means, as screws, for securing it to the carriage. The construction of this cutting-off mechanism is shown at Figs. 4, 6, 9, and 10.

In order to prevent possible damage to work by the conjoint operation of the threading-dies and the cutting-off tools, these are arranged as seen at Fig. 6, by reference to which it will be readily understood that when in their operative position the dies project into the field of the cutting-tools, and thereby prevent the latter from reaching the work. Conversely, when the cutting-tools are in operative position, the dies cannot be projected inward into engagement with the work.

When the cutting-off mechanism is in operation, the cutting-off tools are fed inward intermittently by the engagement of the arms of their feeding-wheels with the movable trip heretofore referred to. When fed inward sufficiently to effect the cutting-off operation, they may readily be withdrawn by reverse movement applied by hand, and their initial engagement with the pipe to be operated upon may be accomplished in the same way before starting the automatic feed. The trip heretofore referred to is hinged to a base 58, (see Figs. 1 and 11,) and at the side of its upper end in the plane of rotation of the carriage on which the cut-off tool is supported is an inclined projection 59. A spring 60 holds the trip in position to engage the arms on the feeding-wheels. If, however, it should happen that either carriage should be left in its fully withdrawn position, its end will strike the inclined surface on the trip and throw the latter back upon its hinge out of the field of rotation of the carriage without breaking or injuring the trip. This will also prevent the forward feeding of the cut-off tools while the threading-dies are at work, which might cause a breakage of some of the parts, as will be understood from the foregoing.

In order that the work may be properly presented to the tools—that is to say, may be rigidly held as against all movement for the cutting-off operation or may be held as against rotation and be given an inward-feeding movement for the operation of the dies—I provide a vise, which is shown in Figs. 1, 2, 3, and 4 of the drawings, and whose base 35 is mounted and adapted to slide, as will be hereinafter set forth, upon ways 36, formed upon the end of the bed. Extending transversely to the length of the machine this base has a T-shaped projection 37, (see Fig. 3,) upon which are mounted two jaw-blocks 38, each provided with suitable V-shaped and serrated jaws 39 adapted to engage the work. At each end the base has a standard 40, and through these standards is journaled a shaft 41.

42 are screws, the one right and the other left hand in its action. These are tapped into the jaw-blocks and have secured thereon gears 43, beyond which said screws terminate in bearings journaled in the standards 40. Upon the shaft 41 are two small gears 44, which mesh with the larger gears upon the screws. A hand wheel or crank 45 is secured upon the end of the shaft for the purpose of operating the latter. By means of this shaft and the small gears thereon the larger gears are caused to rotate, and thereby the screws project or withdraw the jaw-blocks and jaws upon their way. This arrangement of parts forms a very simple and advantageous vise, particularly as the power is applied directly at the rear of the vise-jaws, and the end-thrust of the screws is borne by the standard instead of by some part of the machine below or otherwise out of line with the jaws.

In order to provide for the operation of the vise to effect the feeding of the work or for rigidly securing said vise, I provide a post 46, secured to the bed and projecting upward through a slot 47 in the vise-base. With this post engages the forked end of a lever 48, which is fulcrumed at 49 on the vise-base, and extending transversely is provided with a suitable operating-handle. (Not shown.) By this means the vise may receive a longitudinal movement on the bed, limited only by the length of the slot.

50 is a screw notched at one side, as seen at Fig. 4, and passed through the vise-base, so as to engage the edge of the way on the bed. A handled nut 51 engages the upper end of this screw and serves to lift the latter to bind the bed and base together by a wedging movement, as is apparent from the drawings.

The hollow projection in which the change-speed gearing is mounted has heretofore been referred to as closed at its bottom. This feature of the machine is designed to permit a large quantity of oil to be poured into the base, so that the gears shall run submerged, if desired. The tight inclosure of the gearing also prevents the entrance of dirt or chips.

In the operation of my improved machine, when the same is adapted for threading, the dies are projected outward by means of the hand-wheel, as heretofore set forth. The vise-base is then loosened from the bed, so as to be movable by means of the hand-lever, and the pipe to be threaded is firmly secured in the vise-jaws, which are tightened upon it by means of the shaft and gears. The dies are then projected inward by the hand-wheel into position to engage the end of the pipe, said dies being locked in their inward positions by the eccentric wrists, which, as seen at the right of Fig. 6, are upon a center. Power being applied to the primary shaft, the latter causes the head and dies to revolve either by means of the worm carried directly by the shaft or by means of the geared connection, whereby a higher speed is imparted to said worm, as hereinbefore set forth. The work is then forced into engagement with the dies by means of the lever, and is there held until the threading is completed, when, instead of either reversing the machine or imparting movement to the work, the latter may be disengaged by turning the hand-wheel and withdrawing the dies to the position shown at Fig. 1.

When the machine is to be operated for cutting off, the threading-dies are withdrawn from operative position and the pipe to be cut secured in the vise. By means of the lever the latter may be moved until the exact point to be operated upon is in line with the cutting-off tools. The vise is then clamped firmly to the bed and the cutting-off tools operated into initial engagement with the periphery of the pipe. This is usually done by hand. The movable trip is then adjusted, so that its point is in the field of the arms on the small feeding-wheels, and the machine is started, either of the two speeds being employed. As the head revolves, the feeding-wheels are engaged and turned, one tooth at each revolution, by engagement with the trip, thereby feeding the cutting-tools inward intermittently until the pipe is severed. As the hollow shaft is open at both ends, pipe of any length may be operated upon by the cutting-tools.

The dies for threading may be readily removed and others substituted for them by removing the screws whereby they are secured to the die-blocks.

In this my invention I do not wish to be confined to the exact details of construction herein shown and described, since many minor changes involving only mechanical skill may be made therein without departing from the principle and aim of my invention.

I claim—

1. In a machine of the character described, the combination, with the hollow shaft and suitable tools carried thereby, of the gear mounted upon said shaft, the transversely-arranged primary shaft, the worm upon said primary shaft, a set of change-speed gears, and the means, as described, whereby said worm is connected directly to said primary shaft or is mediately connected therewith through the gears, substantially as set forth.

2. In a machine of the character described, the combination, with the hollow tool-carrying shaft and the spur-gear secured thereon, of the transversely-arranged primary shaft and the means for imparting rotation thereto, the worm and gear secured around said shaft, the change-speed gears, as described, and the stud secured upon the primary shaft, whereby the latter may be locked fast to the worm or may be engaged therewith through the gearing, substantially as set forth.

3. In a machine of the character described, the combination, with the base, of a hollow upward projection therefrom, whereby a cavity is formed for the reception of oil or other lubricant, the hollow shaft journaled in said upward projection, the gear secured upon said shaft, the transverse primary shaft and the worm, and the change-speed gears and the locking-stud whereby the rotation of the worm is varied, substantially as described.

4. In a machine of the character described, the combination, with the hollow shaft and means for rotating the same, of the head secured upon and carried by said hollow shaft, radially-movable dies arranged in said head, and the means, as described, whereby said dies may be projected inward to their operative position or may be projected outward and the shaft-opening left free, substantially as described.

5. In a machine of the character described, the combination, with the hollow rotary shaft and means for operating the same, of the head secured upon said shaft, the dies carried by and radially movable in said head, and the means, as described, for operating said dies to their engaged or disengaged position and for locking said dies in their engaged position, substantially as specified.

6. In a machine of the character described, the combination, with the hollow shaft, the means for operating said shaft, and the head carried by said shaft, of the radially-movable die-blocks, dies adapted to be secured to said blocks, a hand-wheel arranged around the shaft behind the head and independently movable upon said shaft, and the means, as described, interposed between said hand-wheel and the die-blocks, whereby radial movement will be imparted to the latter upon the operation of the former, substantially as described.

7. In a machine of the character described, the combination, with the hollow shaft and means for rotating the same, of the head carried by said shaft, the die-blocks radially movable in said head, the cranked shafts engaging said die-blocks and provided with gears at their rear ends, and a toothed ring and means for operating said ring about the shaft, whereby movement is imparted to said cranked shafts, substantially as specified.

8. In a pipe cutting and threading machine, the combination, with the hollow shaft, the head upon said shaft, and the die-blocks and dies, of the cranked shafts having wrists engaging the die-blocks, gears carried by said shafts within the head, the toothed ring surrounding the hollow shaft, and the hand-wheel secured to and adapted to operate said ring, substantially as described.

9. In a machine of the character described, the combination, with the rotative head and the shaft whereby said head is carried, of the radially-movable dies and die-blocks, the cranked shafts journaled in the head and adapted to operate said die-blocks, gears secured to said shafts within the head, a toothed ring adapted to engage said gears and means for operating said ring, and a locking-pawl and means for disengaging the same, whereby said ring and the gears meshing therewith are securely held, substantially as set forth.

10. In a machine of the character described, the combination, with the rotary head, of die-blocks radially movable in said head, said head being provided with standard-marks, dies also having standard-marks, and means, as described, for securing and adjusting said dies upon the die-blocks, substantially as described.

11. In a machine of the character described, the combination, with the head, the die-blocks and dies, and the short cranked shafts journaled in the head and having gears at their rear ends, of the toothed ring engaging and adapted to operate the gears, the hand-wheel loosely connected to said ring, the pawl adapted to engage and to lock said ring, and the means secured upon the hand-wheel, whereby said pawl may be withdrawn out of engagement, substantially as described.

12. In a machine of the character described, the combination, with the head and the die-blocks and dies arranged therein, of two independently-actuated carriages bearing cut-off tools, and the means, as described, for imparting an inward feeding movement to said carriages, substantially as described.

13. In a machine of the character described, the combination, with the head and the die-blocks and threading-dies carried thereby and movable radially relative thereto, of the carriages bearing cut-off tools arranged alternately with the die-blocks and adapted to move radially in the head, and the means, as described, for imparting to the cutting-off carriages an inward feeding movement, substantially as described.

14. In a machine of the character described, the combination, with the rotary head and the dies radially movable therein, of a pair of radially-movable carriages arranged in said head alternately with the dies and means for moving both the die-blocks and dies and the cutting-off carriages inward, said dies and carriages being so arranged that when either is projected inward it constitutes a stop as against the inward projection of the other, substantially as described.

15. In a machine of the character described, the combination, with the head, of the carriages arranged radially therein and provided with cutting-off tools, screws engaging and adapted to move said carriages, feeding-wheels secured to said screws and projecting beyond the periphery of the head, and a trip secured to the frame of the machine and adapted to engage and turn said wheels, substantially as described.

16. In a machine of the character described, the combination, with the head, of the radially-arranged carriages having bearings in said head and adapted to carry the cut-off tools, screws provided with feeding-wheels whereby the movement of said carriages is effected in both directions, and a hinged tripping device secured to the frame of the machine and adapted to engage the wheels, substantially as described.

17. In a machine of the character described, the combination, with the head, of the carriages provided with cut-off tools arranged radially therein, screws adapted to feed said carriages in both directions, feeding-wheels arranged upon the ends of the screws, a hinged trip adapted to engage and operate the feeding-wheels, and an incline upon said trip arranged in the plane of rotation of the ends of the carriages, substantially as described.

18. In a machine of the character described, the combination, with the threading and cutting-off devices, of a vise mounted and movable longitudinally upon the bed of the machine, a lever fulcrumed upon said carriage, and a post projecting through said carriage from the bed and connected to the end of the lever, substantially as described.

19. In a machine of the character described, the combination, with the threading and cutting-off devices, of a base mounted and adapted to move longitudinally upon the bed of the machine, vise-jaws arranged upon said base, right and left hand screws engaging said jaws and having thrust-bearings immediately behind the center of said jaws, and means, as described, for simultaneously rotating said screws, substantially as described.

20. In a machine of the character described, the combination, with the threading and cutting-off devices, of the vise-jaws mounted and adapted to slide transversely to the bed, right and left hand screws engaging said jaws immediately behind the centers thereof and adapted to operate them, gears secured upon said right and left hand screws, and an operating-shaft having gears meshing with the gears upon the screws, substantially as described.

21. In a machine of the character described, the combination, with the threading and cutting-off devices, of the vise-jaws 39, arranged and adapted to slide transversely to the bed, right and left hand screws 42, having gears 43 engaging and adapted to operate said jaws, standards 40, arranged behind and affording a bearing to take up the thrust of the screws, transverse shaft 41, having gears 44, and a handle 45, all arranged as described, and for the purpose specified.

In testimony whereof I affix my signature in presence of two witnesses.

ARTHUR W. CASH.

Witnesses:
S. H. HUBBARD,
WM. J. TANNER.